United States Patent [19]

Cannon et al.

[11] Patent Number: 5,099,792
[45] Date of Patent: Mar. 31, 1992

[54] INTERCHANGEABLE WHOLE-BODY AND NOSE-ONLY EXPOSURE SYSTEM

[75] Inventors: William C. Cannon; Rudolph T. Allemann, both of Richland, Wash.; Owen R. Moss, Cary, N.C.; John R. Decker, Jr., Pasco, Wash.

[73] Assignee: Battelle Memorial Institute, Richland, Wash.

[21] Appl. No.: 682,759

[22] Filed: Apr. 8, 1991

[51] Int. Cl.⁵ ............................................. A01K 29/00
[52] U.S. Cl. ........................................... 119/15; 119/17
[58] Field of Search .............. 119/17, 15; 128/204.18, 128/203.16

[56] References Cited

U.S. PATENT DOCUMENTS

| | | | |
|---|---|---|---|
| 3,557,785 | 1/1971 | McQueen | 119/15 |
| 4,479,493 | 10/1984 | Bung et al. | 119/15 |
| 4,721,060 | 1/1988 | Cannon et al. | 119/15 |
| 4,860,741 | 8/1989 | Bernstein et al. | 119/15 |

FOREIGN PATENT DOCUMENTS

| | | | |
|---|---|---|---|
| 121795 | 10/1984 | European Pat. Off. | 119/15 |
| 273010 | 6/1988 | European Pat. Off. | 119/15 |
| 2251216 | 5/1974 | Fed. Rep. of Germany | 119/15 |
| 122949 | 7/1984 | Japan | 119/15 |

Primary Examiner—John G. Weiss
Attorney, Agent, or Firm—Robert Keith Sharp

[57] ABSTRACT

An exposure system for experimental animals includes a container for a single animal which has a double wall. The animal is confined within the inner wall. Gaseous material enters a first end, flows over the entire animal, then back between the walls and out the first end. The system also includes an arrangement of valve-controlled manifolds for supplying gaseous material to, and exhausting it from, the containers.

10 Claims, 3 Drawing Sheets

INTERCHANGEABLE WHOLE-BODY AND NOSE-ONLY EXPOSURE SYSTEM

This invention was made with United States (U.S.) Government support, and the Government has rights in accordance with Contract DE-AC06-76RLO 1830 with the U.S. Department of Energy (DOE).

This invention relates to an exposure system for laboratory animals which can be utilized alternatively or simultaneously for whole-body and nose-only exposure of the animals to gases or aerosols, hereinafter termed gaseous materials, and an animal container for use therein.

BACKGROUND

Existing exposure systems for laboratory animals are of two main types. The first is a large chamber in which a considerable number of animals are contained in groups and the entire body exposed to a flow of gaseous material. Such chambers are exemplified by those shown in U.S. Pat. Nos. 4,216,741 and 4,398,498. In another type exemplified by U.S. Pat. No. 4,721,660, the animals are individually contained in relatively small chambers and the gaseous material is supplied in such a manner that only the nose and closely adjacent portions of the animal receive the gas or aerosol. The need has arisen, however, for systems which are more versatile in that they can be used for whole-body exposure or nose-only exposure as desired. It is particularly desirable that the system be suitable for simultaneously exposing some animals to the whole-body treatment and others to the nose-only in order to determine possible differences in effect depending on the mode of exposure to the same atmosphere. This invention is adapted to accomplish those objectives.

U.S. Pat. No. 4,721,060 referenced above discloses an exposure system of the "nose-only" type. In this system gaseous material from a central chamber flows through a number of small tubes to the inlet of bottles in which the experimental animals are contained. Gas is drawn from these bottles to an outer chamber from which it is exhausted to a disposal system. The present system operates in the same general manner as the prior system, but at least some of the bottles or other containers for the animals are so designed that the gas or aerosol passes over the entire body of the animal before going into the exhaust chamber. Since the basic system is the same, it is only necessary to interchange the type of animal containers in order to change between nose-only and whole-body exposure of the animals. As a secondary matter, the invention includes improvements in the circulation system for the atmosphere to which the animal is exposed.

In more detail, the animal container is, in general, of the bottle type but contains a wire cage or wire mesh restrainer or holder which is spaced from the walls of the bottle so that gaseous material may flow about the entire animal. A return passage is provided from the end of the container back to the exhaust manifold. Preferably, this is accomplished by making the container of double-walled construction with the inner wall forming the primary container and connected to the inlet manifold and the space between the walls connected to the exhaust manifold. The inner wall terminates short of the outer wall and is open at its end remote from the manifolds. The inlet and exhaust manifolds may be concentric as described in the above U.S. Pat. No. 4,721,060, or they may be of box-like (and/or) tubular construction. The choice will depend on the particular laboratory environment in which the system is to be used.

In one embodiment of the last named type, the animal container and the inlet tubes supplying the gas to the animals and the exhaust ports leading from the containers are arranged in vertical columns. A tubular horizontal inlet manifold extends along the top, and vertical sub-manifolds are connected to the inlet manifold. Valve connections extend from the inlet manifold to each of the vertical sub-manifolds so that gas or aerosol can be supplied selectively to any or all of the columns of containers. A single large exhaust manifold surrounds the inlet tubes and is connected to the exhaust ports from the containers. The entire system may be mounted on a cart for ready movement about the laboratory.

DETAILED DESCRIPTION

Figure 1:
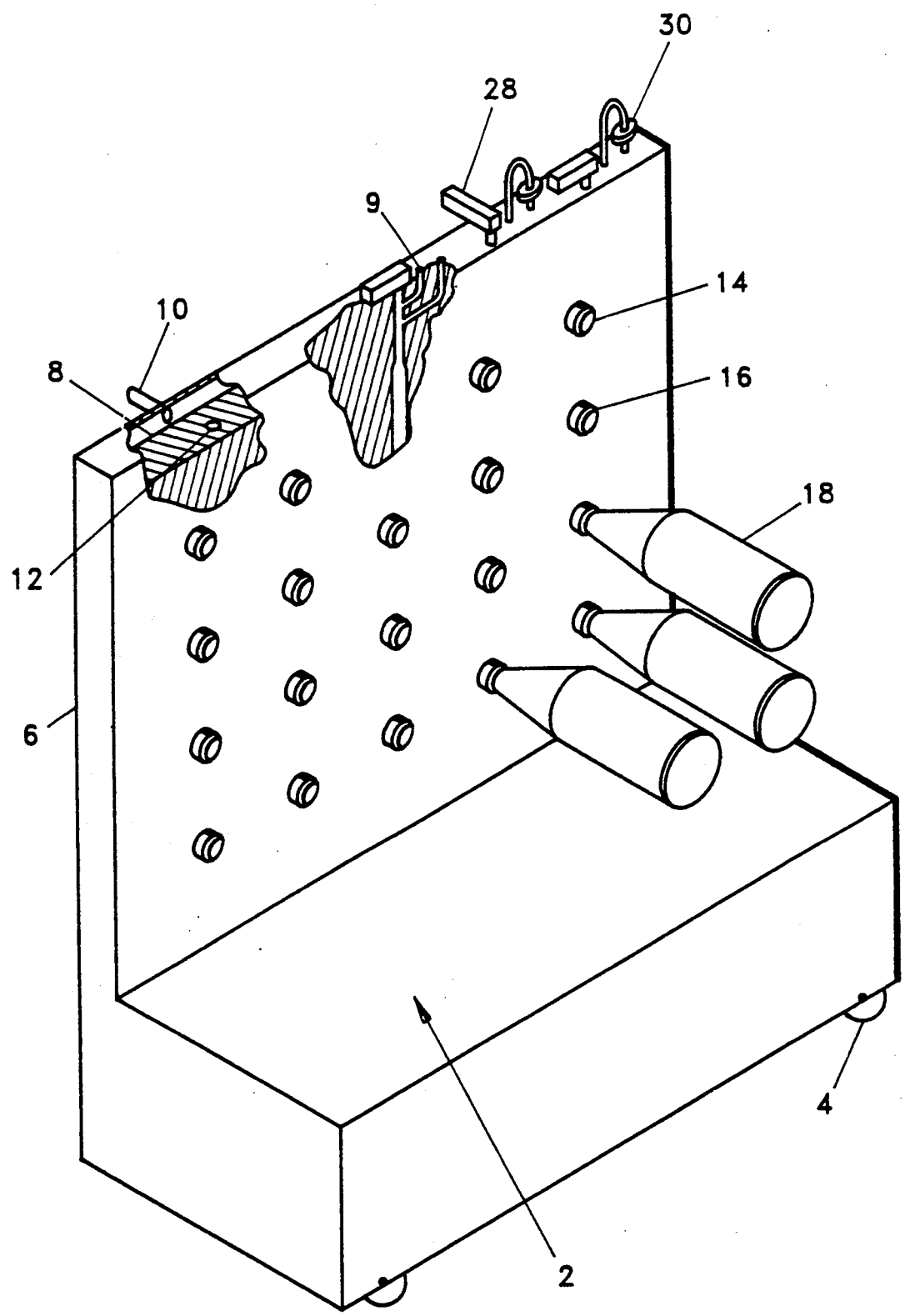
FIG. 1 is a perspective view of the cart-mounted model with parts omitted for clarity and other parts broken away to show interior structure.

Referring to FIG. 1, this embodiment of our exposure system is mounted on a cart 2 having wheels or castors 4. The exposure system comprises a vertical panel 6. At the top of the panel is an inlet manifold 8 which extends the entire width of the panel 6. It is provided with an inlet 10 for gaseous material, and feeds to a plurality of vertical sub-manifolds 12, each of which feeds to a plurality of inlet tubes 14 (FIGS. 1, 2, and 4); each of the latter is surrounded by an exhaust port 16. The inlet tubes and exhaust ports are in turn each connected to one of the plurality of animal containers 18.

Figure 2:
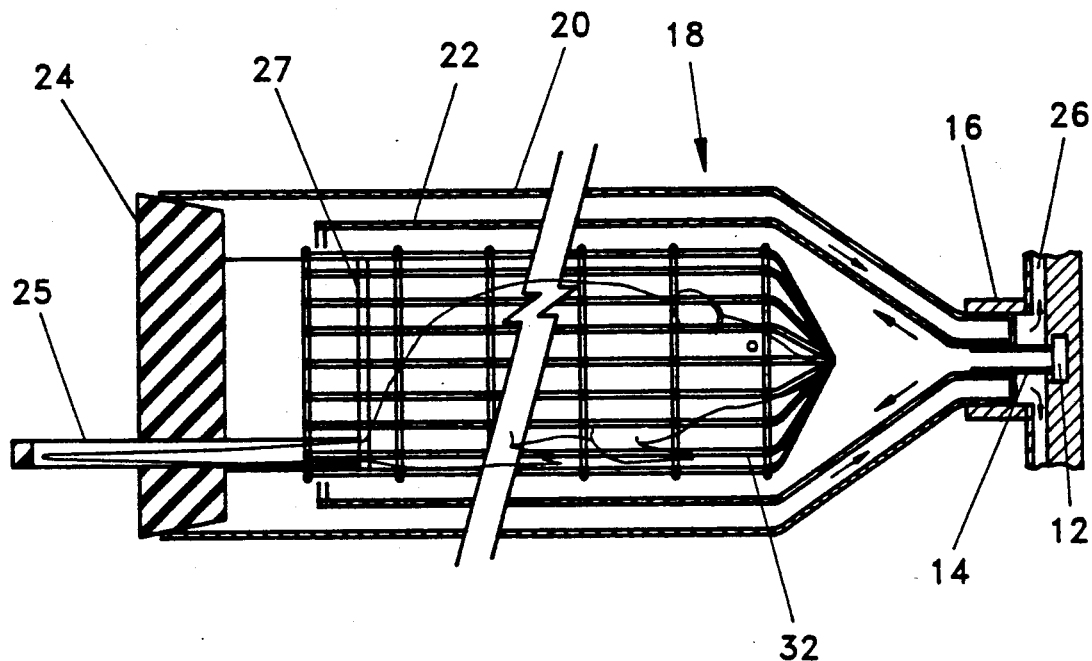
FIG. 2 is a horizontal section through one of the containers of FIG. 1, showing its connection to the exhaust manifold.
Figure 3:
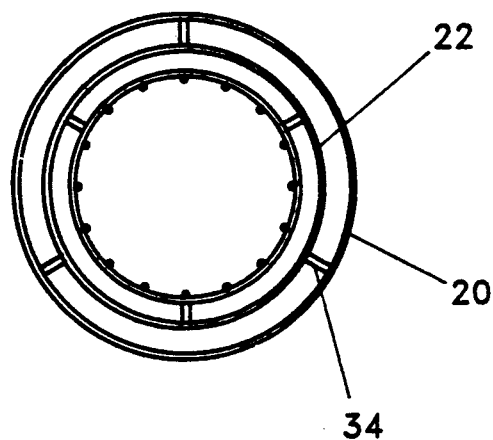
FIG. 3 is a section taken on line 3—3 of FIG. 2.

These containers and their connections are best shown in FIG. 2 and 3. Referring to these figures, each container comprises an outer shell 20 and an inner shell 22, and it will be noted that the inner shell terminates short of the outer shell at the end of the container remote from the manifold. The remote end of the outer shell is closed by a removable plug 24 through which extends a tube 25 made of metal having high thermal conductivity, e.g., aluminum. It will be noted that each of these shells includes a relatively large diameter portion and a relatively small diameter portion connected by a frusto-conical section. The small diameter portion of the outer shell 20 fits within the exhaust port 16 while the small diameter portion of the inner shell 22 fits over an inlet tube 14. Exhaust manifold 26 extends the entire width and height of the panel 6 and surrounds all the inlet tubes 14. It connects with all the exhaust ports 16. As has been noted, each of the inlet tubes 14 is connected to a vertical sub-manifold 12.

Figure 4:
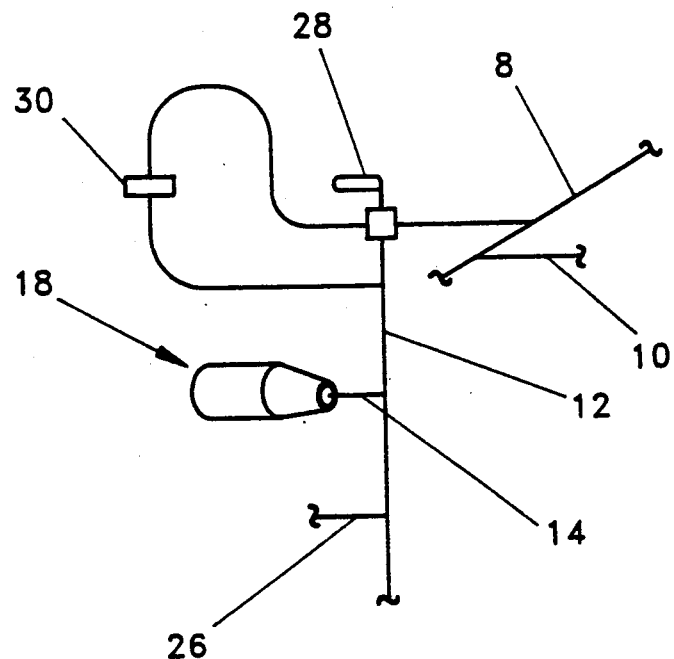
FIGS. 4, 5, and 6 are diagramatic views of the air system and the air flow with different settings of a valve 28.
Figure 5:
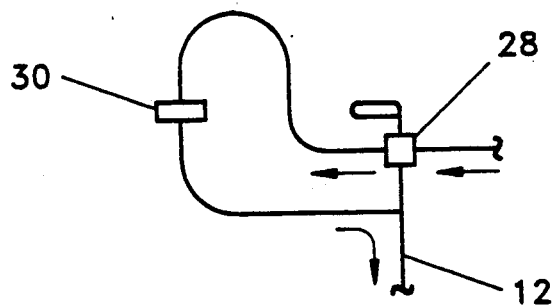
Figure 6:
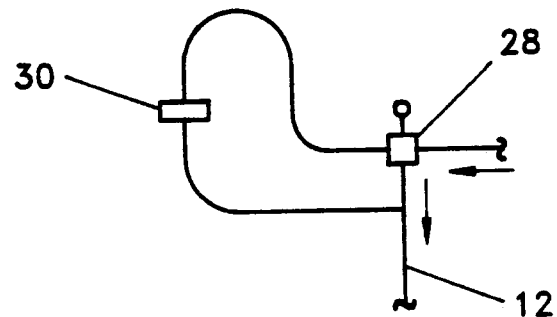

Referring to FIGS. 4, 5, and 6, each of the sub-manifolds 12 is provided with a valve 28 which connects with the inlet manifold 8. Depending on the setting of the valve, gaseous material can be emitted directly to a sub-manifold 12 (FIG. 6), admitted thereto by way of filter 30 (FIG. 5), or shut off (FIG. 4).

Returning to FIGS. 2 and 3, each container 18 is provided with an animal restrainer or cage 32, preferably formed of wire mesh and spaced from inner casing 22 by spacers 34. Preferably, these restrainers are provided with positioning flanges 27 secured to tail cylinders 25. As disclosed in U.S. Pat. No. 4,721,060, tubes 25 are slidable in plugs 24 so that flanges 27 hold the animals in the desired positions. Tubes 25 receive the tails of rodents and dissipate heat, as described in that patent, column 2, lines 27-47.

OPERATION

In use, animals (e.g., rats) are placed in restrainers 32. Gaseous material is admitted to manifold 8 through inlet 10 and is distributed by sub-manifolds 12 through the containers 18. It flows through the inner shell 22 to the space between the shells, and finally to the exhaust manifold 26 from which it is withdrawn. By proper manipulation of valves 28, it can be selectively admitted to individual sub-manifolds either directly or through filters 30, or it can be shut off from a particular manifold. Furthermore, some or all of the containers 18 may be replaced by those of the type shown at 40 in U.S. Pat. No. 4,721,060. When the latter type are used, only the nose of the animal receives the gaseous material. Hence, it is possible to treat the animals in either the "whole-body" or "nose-only" mode. This may vary from animal to animal.

Alternatively, the apparatus shown in U.S. Pat. No. 4,721,060 may be employed, with the containment 18, described above, replacing some or all of the bottles 40 of that patent.

While we have described certain embodiments of our invention in considerable detail, it will be apparent to those skilled in the art that variations are possible. Therefore, we wish our invention to be limited solely to the scope of the appended claims.

The embodiments of the invention in which a proprietary right or privilege is claimed are defined as follows:

1. A container for use in a system for exposing experimental animals to gaseous material, said container being adapted to expose the entire body of said animal to said gaseous material and comprising an outer shell and an inner shell spaced apart from each other to leave a passageway between them, said inner shell terminating short of said outer shell at each end, said shells each having a small end and a large end, a closure for the large end of said outer shell, an animal cage within said inner shell and spaced therefrom, said cage being of open construction and adapted to hold an experimental animal.

2. A container as defined in claim 1, and further comprising a cylindrical tube having high heat conductivity, having an open end positioned within said cage and passing through said closure and having a closed outer end.

3. A container as defined in claim 1, said container comprising a cylindrical portion of relatively large diameter and a second cylindrical portion of relatively small diameter, a frusto conical portion extending between said cylindrical portions, said closure being provided at the end of said cylindrical portion of relatively large diameter remote from said cylindrical portion of relatively small diameter.

4. An exposure system for delivering gaseous material to the entire body of each of a considerable number of experimental animals comprising:

(a) at least one inlet manifold constructed and arranged to receive gaseous material;
   (b) at least one sub-manifold constructed and arranged to receive gaseous material;
   (c) a plurality of small-diameter supply tubes extending outwardly from said sub-manifold;
   (d) an exhaust manifold surrounding a portion of plurality of said supply tubes;
   (e) a nipple surrounding each of said plurality of said supply tubes and extending outwardly of said exhaust manifold;
   (f) at least one container for an experimental animal having at least one shell with a reduced end surrounding one of said supply tubes and connected to one of said nipples and an animal restrainer of open construction mounted within said container.

5. An exposure system as defined in claim 4, wherein said container further comprises:

a closure for an end of said container remote from said nipple;
   a return passage extending from said remote end to said nipple whereby gaseous material will pass from said sub-manifold through an inlet tube to a container, pass over the entire body of an animal in said restrainer, and then flow to said exhaust manifold.

6. An exposure system as defined in claim 5 and further comprising a tube having an open end within said restrainer and extending through said closure, said tube being closed at its outer end and being positioned so as to receive the tail of an animal within said restrainer.

7. A system as defined in claim 5 wherein said container is of double-wall construction with an open space between said walls, the innermost wall terminating short of said closure, whereby the space between said walls will form the return passage for gaseous material to said outlet manifold.

8. A system as defined in claim 4 and comprising a plurality of sub-manifolds, each connected to said inlet manifold by a valved connection whereby gaseous material may be selectively supplied to only chosen sub-manifolds.

9. A system as defined in claim 5 wherein said inlet manifold is horizontal and said sub-manifolds are vertical and spaced from each other, said sub-manifolds being connected to said inlet manifold at their upper ends.

10. An exposure system for delivering gaseous material to the entire body of each of a considerable number of experimental animals comprising:

(a) at least one inlet manifold constructed and arranged to receive gaseous material;
   (b) at least one sub-manifold connected to said inlet manifold so as to receive gaseous material therefrom;
   (c) a plurality of small-diameter supply tubes extending outwardly from said sub-manifold;
   (d) an exhaust manifold surrounding a portion of plurality of said supply tubes;
   (e) a nipple surrounding each of said plurality of said supply tubes and extending outwardly of said exhaust manifold;
   (f) at least one container for an experimental animal having double-wall construction with an open space between said walls, the innermost wall terminating short of one end of the outermost wall, whereby the space between said walls will form the return passage for gaseous material to said outlet manifold.

* * * * *

UNITED STATES PATENT AND TRADEMARK OFFICE
CERTIFICATE OF CORRECTION

PATENT NO. : 5,099,792
DATED : March 31, 1992
INVENTOR(S) : WC Cannon, RT Alleman, OR MOSS, JR Decker It is certified that error appears in the above-indentified patent and that said Letters Patent is hereby corrected as shown below:

In Column 4, lines 3 and 4, replace "constructed and arranged" with --connected to said inlet manifold so as--.

In column 4, line 4, after the word "material", add the word --therefrom--.

Signed and Sealed this

Twenty-ninth Day of June, 1993

Attest:

MICHAEL K. KIRK

Attesting Officer    Acting Commissioner of Patents and Trademarks